(12) United States Patent
Yang (10) Patent No.: US 7,270,148 B2
(45) Date of Patent: Sep. 18, 2007

(54) FAUCET WITH TEMPERATURE CONTROL HAVING REPLACEABLE HANDLE

(76) Inventor: Tsai-Chen Yang, 235 Chung-Ho Box 8-24, Taipei (TW)

( * ) Notice: Subject to any disclaimer, the term of this patent is extended or adjusted under 35 U.S.C. 154(b) by 79 days.

(21) Appl. No.: 11/230,621

(22) Filed: Sep. 21, 2005

(65) Prior Publication Data

US 2007/0062581 A1   Mar. 22, 2007

(51) Int. Cl.
*F16K 27/00* (2006.01)

(52) U.S. Cl. .............................. 137/556.6; 137/315.15; 137/359; 251/293

(58) Field of Classification Search .......... 137/315.15, 137/315.12, 801, 553, 556, 556.3, 556.6, 137/359; 251/293
See application file for complete search history.

(56) References Cited

U.S. PATENT DOCUMENTS

| | | | | |
|---|---|---|---|---|
| 3,582,116 A | * | 6/1971 | Young | 251/293 |
| 5,836,333 A | * | 11/1998 | Haynes | 137/556 |
| 5,947,149 A | * | 9/1999 | Mark | 137/359 |

* cited by examiner

*Primary Examiner*—Kevin Lee (57) ABSTRACT

A faucet with temperature control having a replaceable handle comprises a movable conversion mechanism connecting a hollow conversion sleeve thereof, wherein a water passage is hidden. The conversion sleeve further includes a section of teeth that is engaged with a water control knob, and the passage of the conversion sleeve is provided with an inner screw thread for connecting the bottom end of a spindle. The other end of the spindle is connected to a knob or a switch handle. Thereby, the conversion sleeve and the spindle facilitate the replacement of the switch handle, in which only the conversion rod of the switch handle is needed to be changed.

2 Claims, 8 Drawing Sheets

FAUCET WITH TEMPERATURE CONTROL HAVING REPLACEABLE HANDLE

FIELD OF THE INVENTION

The present invention relates to faucets, more particularly to a faucet with temperature control having a replaceable handle whose handle can be replaced easily.

BACKGROUND OF THE INVENTION

A bathroom faucet of the prior art utilizes a switch handle mounted on the top end of a spindle in the faucet; the spindle is connected to a sleeve and a water control knob for controlling the flow quantity of the valve.

Figure 8:
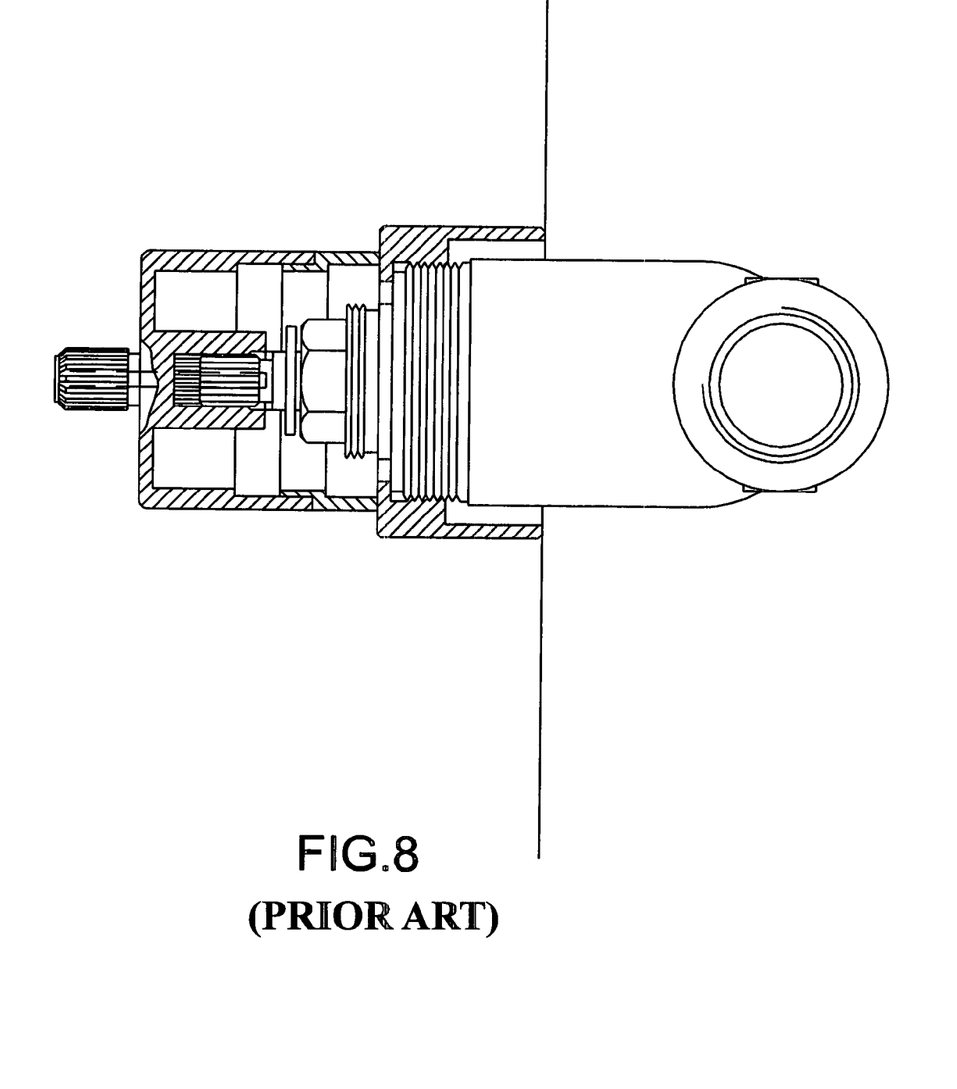
FIG. 8 is a side cross-sectional view of a faucet with temperature control having a replaceable handle of the prior art.

Therefore, as shown in FIG. 8, a conventional faucet with temperature control having a replaceable handle is invented and comprises a spindle whose bottom end is enlarged to form a hollow conversion sleeve, and the outer surface of the sleeve is provided with temperature indicators. Further, the inner wall of the sleeve is provided with a screw thread for connecting the water control knob within the main valve body. The conversion mechanism is driven by the handle mounted on the top end of the spindle, whereby the hot water temperature can be precisely adjusted by rotating the water control valve and indicated by the set of temperature indicators.

The faucet with temperature control having a replaceable handle described above has a conversion mechanism capable of controlling flow quantity as well as temperature control. However, subject to the emphasis of modern people on the outlooks of faucets, the conventional faucet with temperature control having a replaceable handle incapable of changing handles easily cannot satisfies the diversity of them. Therefore, switches for a faucet with temperature control that can be easily replaced are needed.

However, it is the inconvenient to change the faucet with temperature control having a replaceable handle of the prior art, due to the integral design of the conversion sleeve and the spindle. To change the switch, the whole conversion mechanism has to be taken down, and the connection portion with teeth attached to the handle has to be replaced, which is costly and not practical.

SUMMARY OF THE INVENTION

The primary objective of the present invention is to provide a faucet with temperature control having a replaceable handle whose switch handle can be quickly and easily replaced. Therefore, the manufacturing cost can be reduced.

The secondary objective of the present invention is to provide a faucet with temperature control having a replaceable handle whose switch handle can be cheaply replaced. Therefore, the replacement of the handle is economical to the consumers.

To achieve above object, the present invention provides a faucet with temperature control having a replaceable handle, comprises a main valve body having a valve tube extended perpendicular to a longitudinal direction of thereof, a water control valve capable of adjusting the water flow rate being disposed within said valve tube, said water control valve being connected to a control rod extended along said longitudinal direction of said main valve body, said control rod being extended out of said main valve body to form a water control knob with parallel and longitudinally arranged teeth; a conversion mechanism further comprising a conversion sleeve and a conversion rod, said conversion sleeve being a hollow ring body with a stepwise inner wall, said conversion sleeve being provided with a central, longitudinal connection portion said conversion rod on an end thereof; said connection portion having an outwardly and longitudinally extended section erected on said end of said conversion sleeve and an inwardly and longitudinally extended section hidden in said conversion sleeve and with a section of parallel teeth on an inner wall thereof, said outwardly and longitudinally extended section being provided with an inner screw thread, said conversion rod being provided with an outer screw thread at an bottom end thereof for the engagement with said inner crew thread of said conversion sleeve, a top end of said conversion rod being provided with a section of parallel and longitudinally elongated teeth; and a handle forming a driving part for driving said conversion rod, said handle and said conversion rod being connected by the engagement between a section of longitudinally elongated teeth formed at the bottom end of said handle and said section of teeth of said conversion rod;

The various objects and advantages of the present invention will be more readily understood from the following detailed description when read in conjunction with the appended drawings.

BRIEF DESCRIPTION OF THE DRAWINGS

FIGS. 5A. 5B and 5C show respectively three switches for a faucet with temperature control of the present invention having different handles.

DETAILED DESCRIPTION OF THE PREFERRED EMBODIMENT

Figure 1:
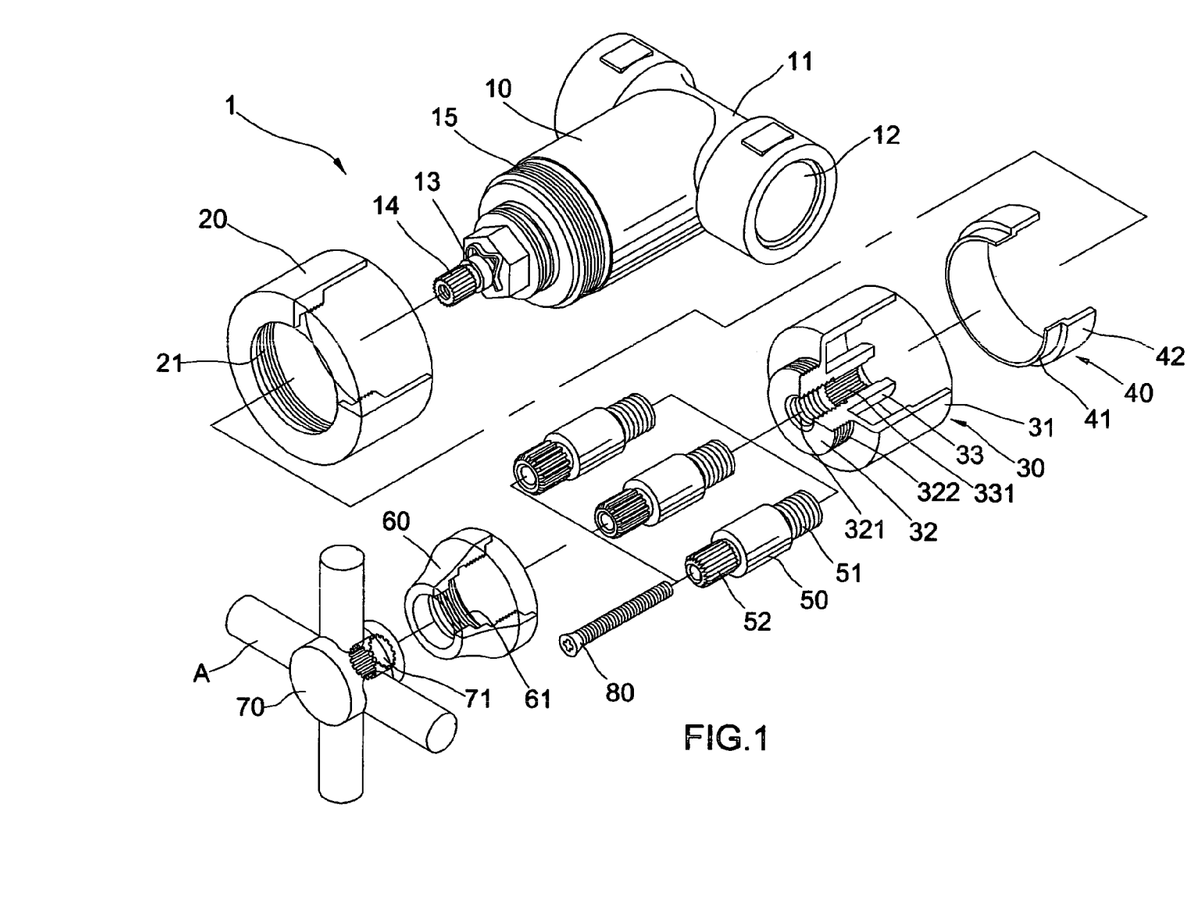
FIG. 1 is an exploded perspective view of a faucet with temperature control having a replaceable handle of the present invention.

Referring to FIG. 1, a faucet with temperature control having a replaceable handle (faucet 1) comprises a main valve body 10, a first decorative cap 20, a conversion sleeve 30, an indication ring 40, a conversion rod 50, a second decorative cap 60 and a handle 70.

A valve tube 11 of predetermined diameter is extended across the bottom terminal of the main valve body 10, wherein a flow passage 12 passes. The valve tube 11 is perpendicular to the main valve body 10. The place where the main valve body 10 and the valve tube 11 are connected is provided with a water control valve of the prior art, which will not be specified in the figure. However, the water control valve is driven by a longitudinal spindle 13 along the main valve body 10. The top end of the spindle 13 is extended with a water control knob 14, which is in turn provided with annularly arranged teeth for the engagement with a foreign control device.

The first decorative cap 20 is a hollow cylinder, the inner wall of which is provided with three stepped walls. The middle one of the walls is provided with an inner screw thread 21 for the engagement with an outer screw thread 15 on the outer wall of the main valve body 1, as the first decorative cap 20 is being mounted onto the main valve body 1. The upper one of the walls has the smallest inner diameter designed as so to be attached on the corresponding part of the main valve body 1.

The conversion mechanism includes a conversion sleeve 30 and a conversion rod 50. The conversion sleeve 30 being a hollow ring body capable of being engaged with the main valve body 1 in the longitudinal direction. The inner wall of the conversion sleeve 30 forms a gradually expended stepwise block surface 31 for connecting an indication ring 40. The central part of the top end of the conversion sleeve 30 is extended, both inwardly and outwardly, with a connection section, which connection portion further comprises an inwardly extended section 33 and an outwardly extended section 32. There is a passage going through the axes of the outwardly extended section 32 and the inwardly extended section 33. The axial passage is further provided with a connecting section with parallel teeth 331 corresponding to the water control knob 14, whereby the conversion sleeve 30 and the connector 10 are mutually connected. The inner wall of the outwardly extended section 32 is proved with an inner screw thread 321, whereas the outer wall of the inwardly extended section 33 is provided with an outer screw thread 322, respectively for engaging the conversion rod 50 and the first decorative cap 20.

The indication ring 40 being a hollow ring body with a stepwise inner wall has a first annular surface 41 on the top thereof for the connection between the indication ring 40 and the conversion sleeve 30, whereby the conversion sleeve 30 and the indication ring 40 will rotate synchronically. The top surface of the next section of the indication ring 40 around the first annular surface 41 forms a second annular surface 42. The second annular surface 42 is carved with temperature indicators 43. Of course, the temperature indicators 43 are not necessary, which can be replaced by showing water temperature directly by marks carved on the bottom end of the conversion sleeve 30.

The conversion rod 50 being a cylindrical rod has an outer screw thread 51 at a bottom end thereof for connecting the conversion sleeve 30. The top end of the conversion rod 50 is provided with a connection knob 52 being a section of parallel teeth.

A second decorative cap 60 is a cap body with a stepwise inner wall. The inner wall of the second decorative cap 60 is provided with an inner screw thread 61 for the engagement with the outwardly extended section 32 from the conversion sleeve 30 Further, the conversion rod 50 passes through the second decorative cap 60 and is locked with the outwardly extended section 32, and the connection knob 52 at the top end of the conversion rod 50 is extended out of the second decorative cap 60, whereby the second decorative cap 60 will cover most of the conversion rod 50 and therefore beautifies the faucet.

A handle 70 is used for driving the water control valve 14 so as to adjust the water flow rate. The handle 70 comprises a connecting section 71 having an inner wall provided with a section of parallel teeth for engaging the corresponding section of parallel teeth of the connection knob 52, whereby the handle 70 and the conversion rod 50 are rotationally connected and can move synchronically.

Figure 2:
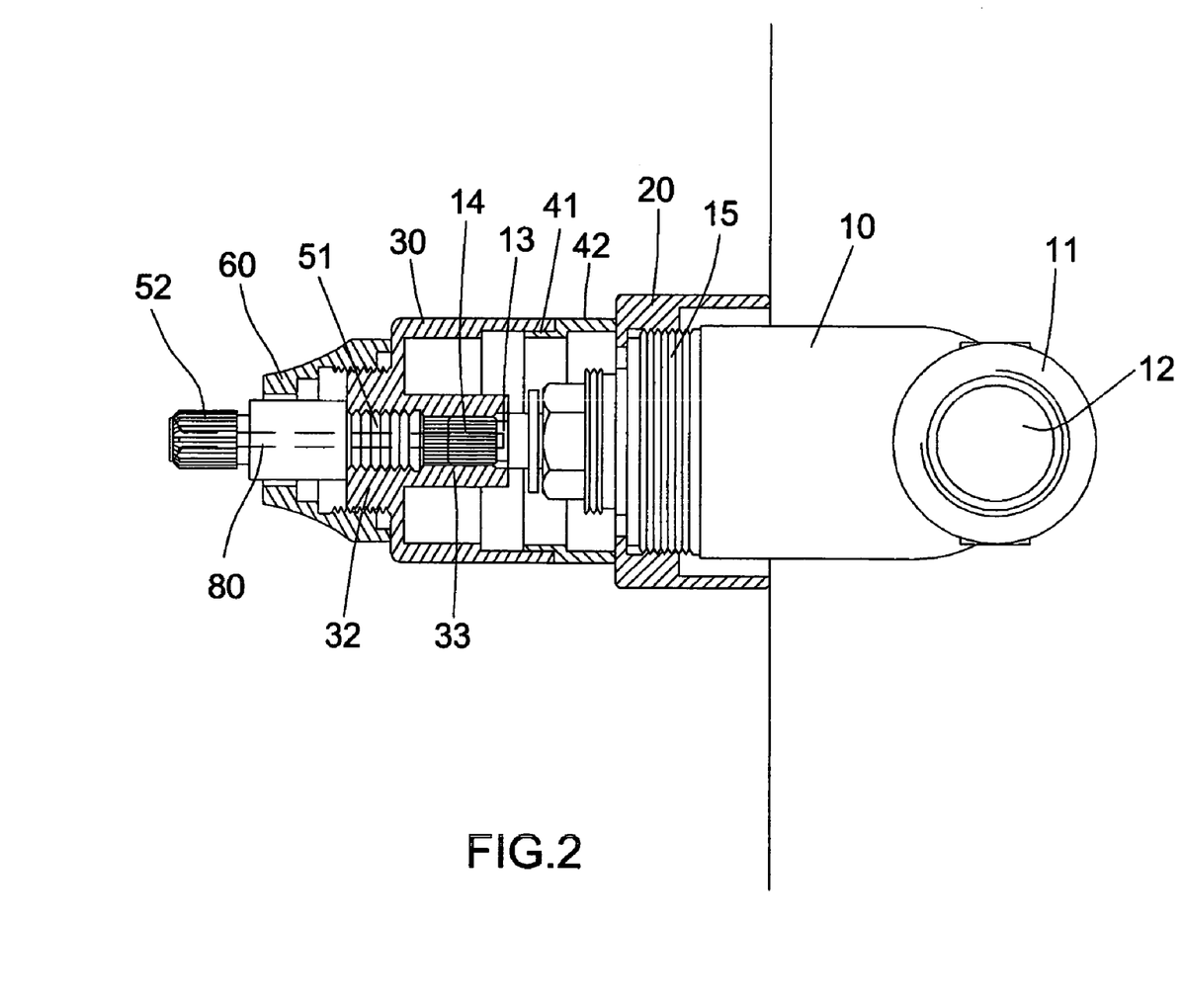
FIG. 2 is a side cross-sectional view of a faucet with temperature control having a replaceable handle of the present invention.
Figure 3:
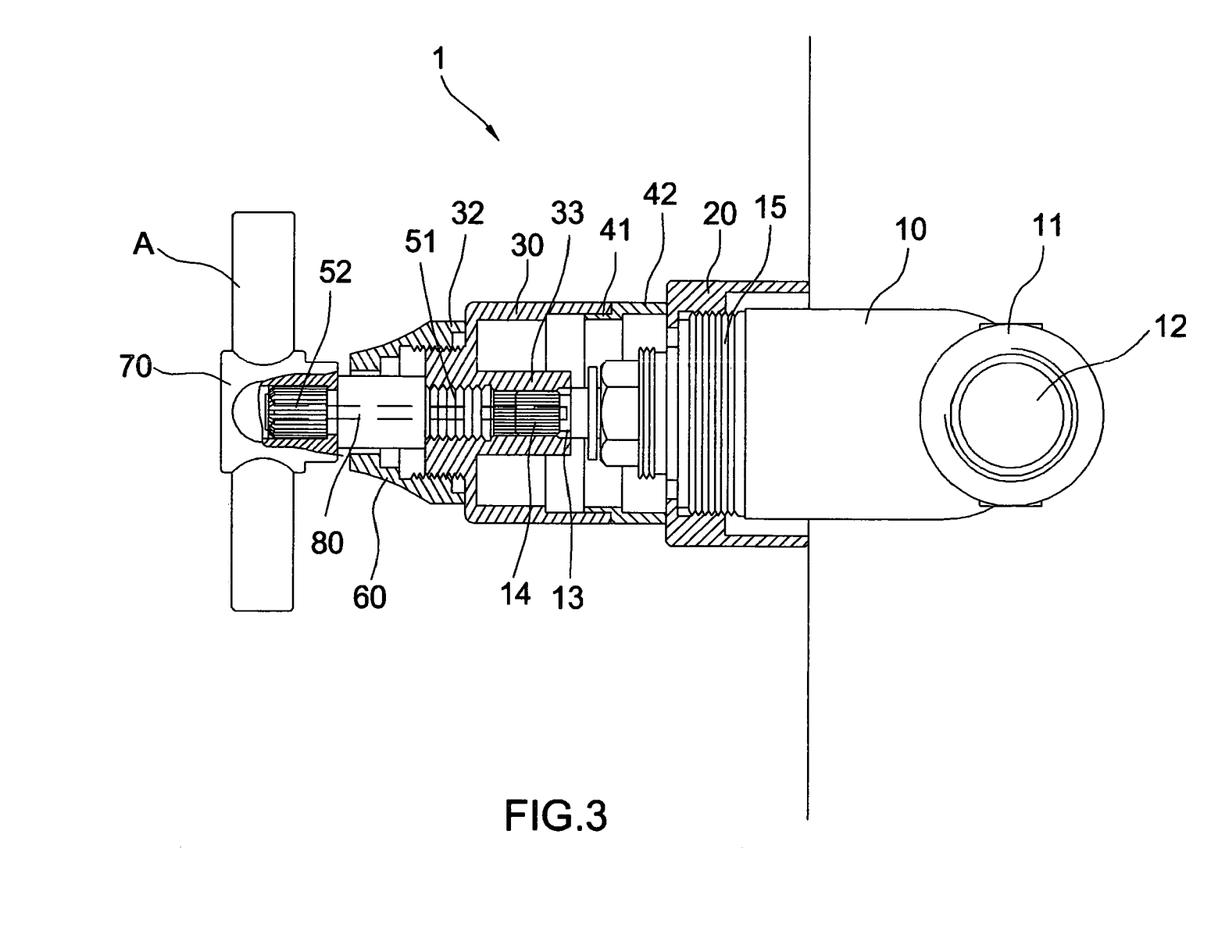
FIG. 3 is a side cross-sectional view of the faucet with temperature control having a replaceable handle in FIG. 1.
Figure 4:
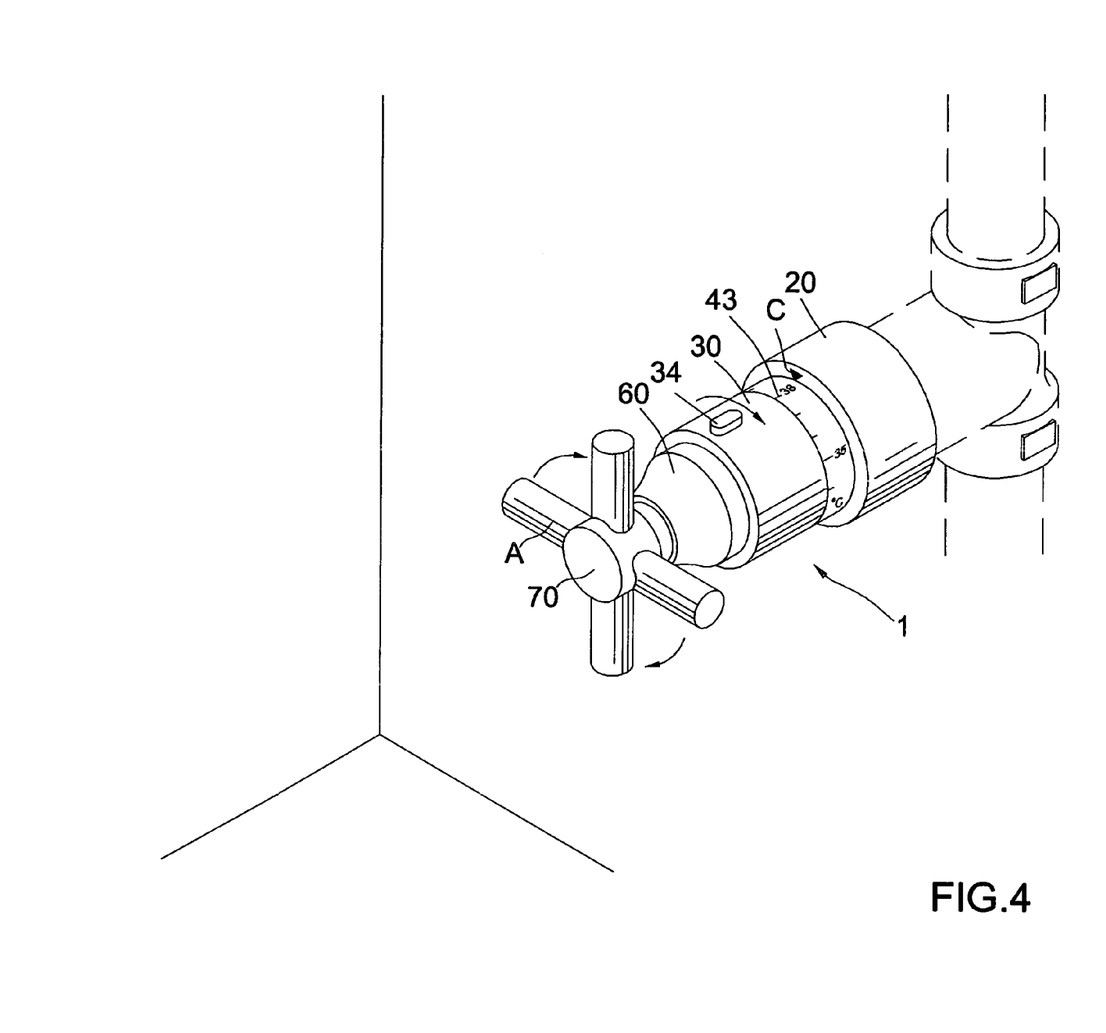
FIG. 4 illustrates the operation of the faucet with temperature control having a replaceable handle in FIG. 1.

Referring to FIGS. 2, 3, 4, the assembly of the faucet 1 is firstly done by connecting the valve tube of the main valve body 10 with a water inlet tube. Then the first decorative cap 20 is connected to the main valve body 10, and the conversion sleeve 30 provided with the indication ring 40 is engaged with the water control knob 14 in the main valve body 10. Then, the conversion rod 50 is coupled with the outwardly extended section 32 of the conversion sleeve 30. The second decorative cap 60 is then connected to the conversion sleeve 30 by the outer screw thread 322 thereon, as shown in FIG. 2. The conversion rod 50, the conversion sleeve 30 and the water control knob 14 are fixed by a screwed rod 80. Finally, the recessed connecting portion 71 with inner, longitudinally elongated teeth will be engaged with the connection knob 52 of the conversion rod 50, as shown in FIGS. 3 and 4.

Referring to FIG. 4, the faucet 1 of the present invention adopts movable connection technology, in that a user twists the cross-shaped driving part of the handle 70, and the conversion rod 50 and the coupled conversion sleeve 30 will move accordingly. The conversion sleeve 30 of the main valve body 10 will in turn drive the water control knob 14 in the main valve body 10. An, eventually, the water control valve 52 in the valve tube 11 of the main valve body 10 will be activated to adjust the flow rate of the water passing the valve tube 11. After suitable calibration, the arrow indicator of the indication portion C on the top surface of the first decorative cap 20 can be pointed to the indication ring 40 to show the water temperature. Thereby, the handle 70 can adjust for a suitable water temperature for a user and therefore protect the user's safety.

Figures 5A, 5B, 5C:
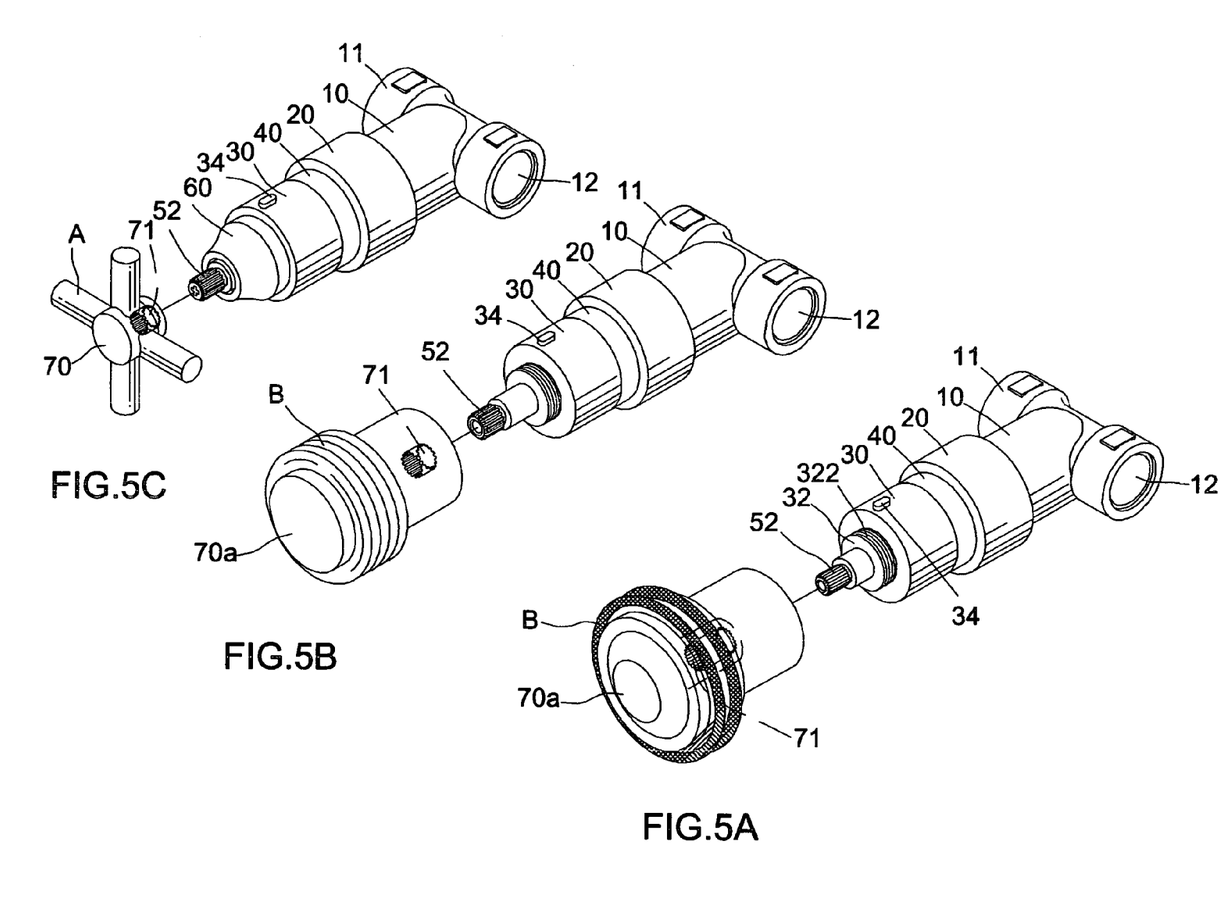

Referring to FIGS. 5A, 5B, 5C, when the handle 70 is cross-shaped, it is likely that the connection between the conversion rod 50 and the handle 70 will leave an exposed section of the conversion rod 50. Therefore, a second decorative cap 60 can be added to where the conversion rod 50 and the handle 70 are connected.

As shown in FIGS. 5A and 5B, the handles of the faucet 1 in other preferred embodiments can be round cylinders, which are driving parts B for the switches for a faucet with temperature control. Since the bottom end of a handle is a recessed portion, the conversion rod 50 will be hidden by the handle 70 after they are coupled. In this consideration, the second decorative cap 60 is not necessary.

Therefore, the primary objective of the present invention is to provide bathroom or kitchen faucets allowing the flexibility of switching the handles thereon, so that the maintenance of faucets will be cheap and easy. The main feature of the present invention is a conversion mechanism having a conversion sleeve 30 and a conversion rod 50 mutually connected by screwed structures. The handle 70 is mounted to the conversion rod 50 through respective sections of longitudinally elongated teeth.

Figure 6:
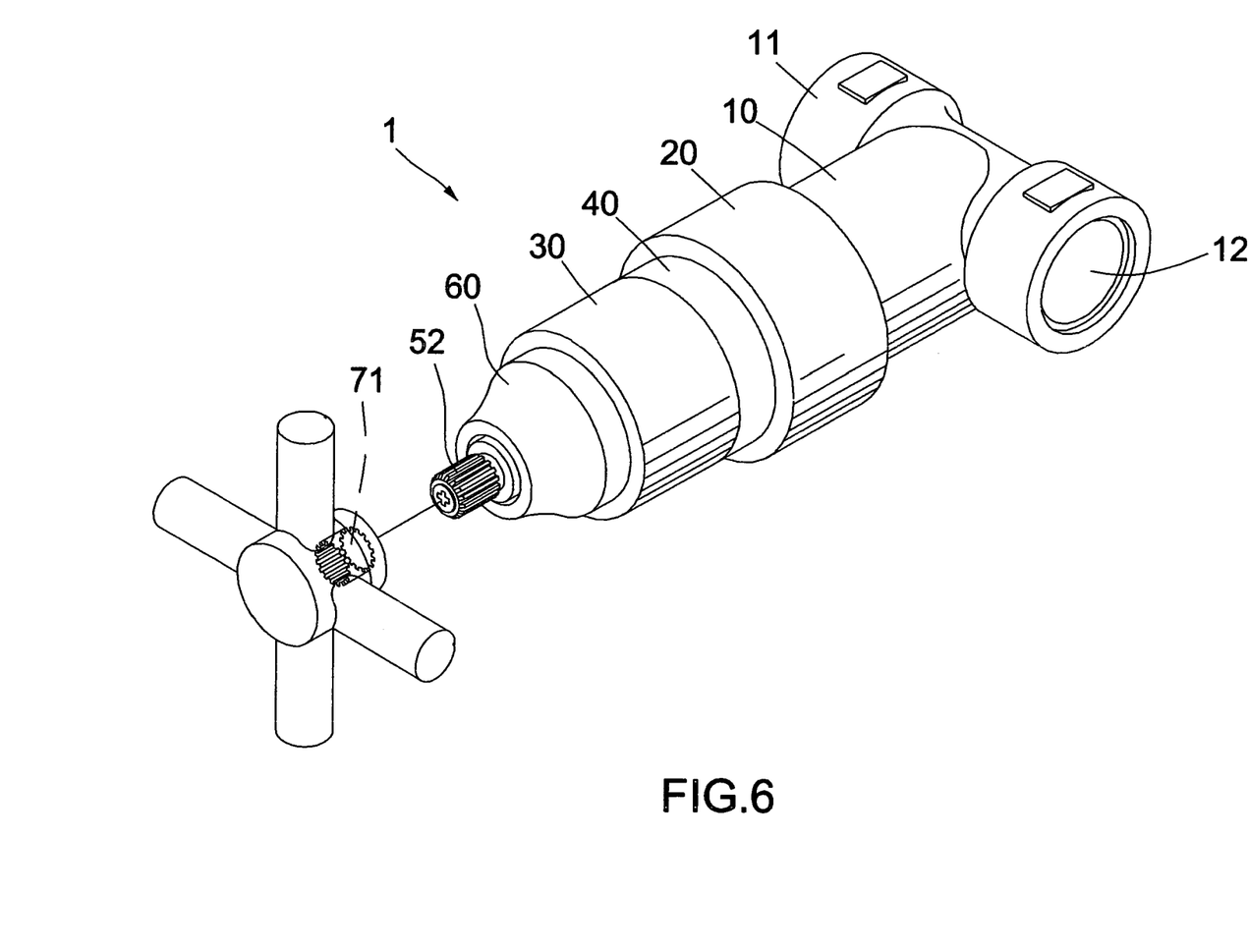
FIG. 6 shows the process of changing the cross handle of the preferred embodiment in FIG. 5C.
Figure 7:
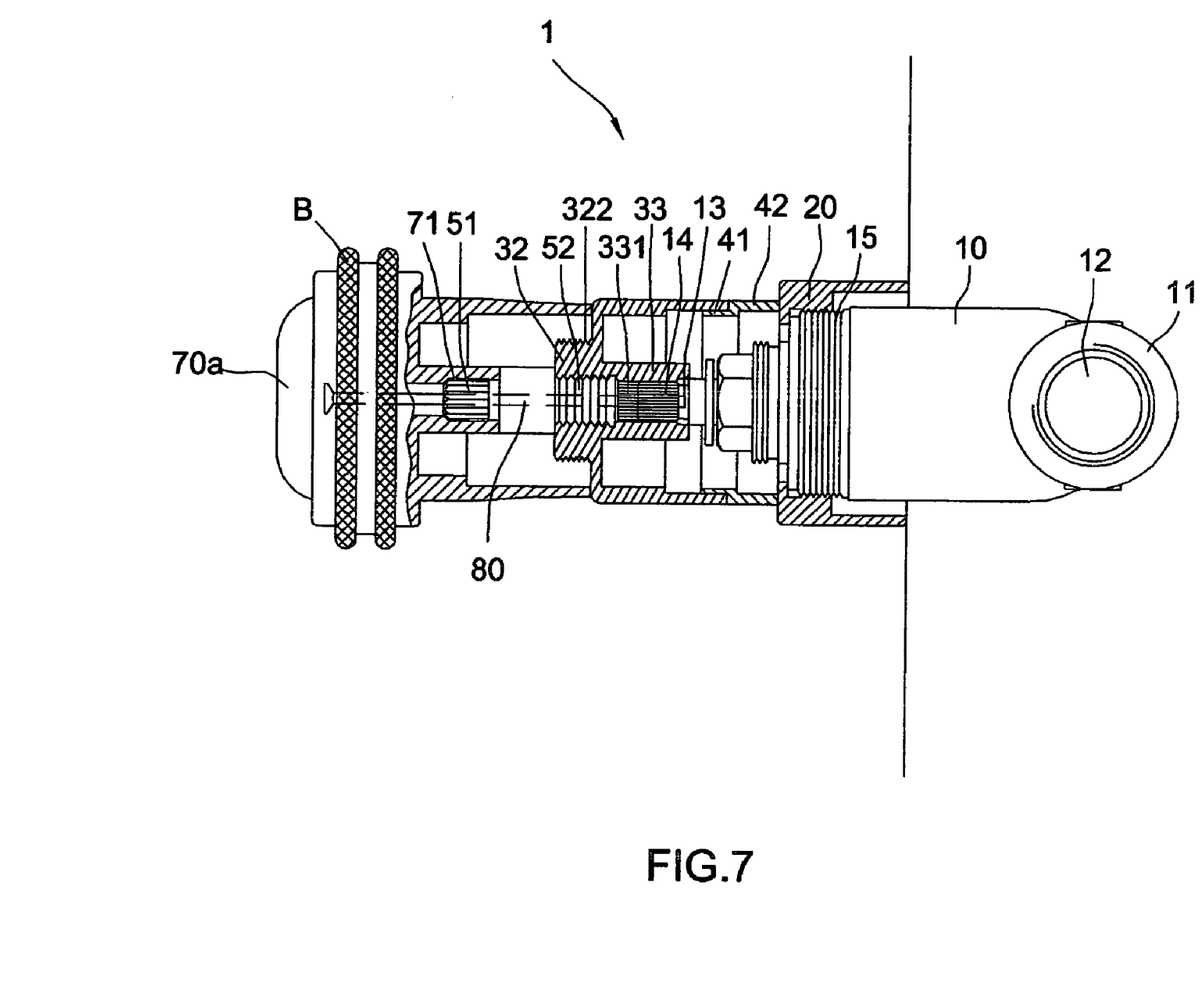
FIG. 7 is a faucet with temperature control having a replaceable handle having a cylindrical handle.

Referring to FIG. 6, when the cross-shaped driving part A of the handle 70 is changed to a cylindrical driving part B of the handle 70a, the handle 70 is taken off firstly, and then the conversion rod 50 mounted on the conversion sleeve 30 is released and replaced by another conversion rod that fits the handle 70a. Therefore, the replacement does not need complete disassembly of the whole conversion mechanism.

Further, a consumer of the faucet can do the replacement easily and quickly. All he or she to pay is a conversion rod suitable to the handle to be changed, largely reducing the cost of such a replacement.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A faucet with temperature control function having a replaceable handle comprising a main valve body, a first decorative cap, a conversion sleeve, an indication ring, a conversion rod, a second decorative cap and a handle; wherein a valve tube of predetermined diameter is extended across a bottom terminal of the main valve body, wherein a flow passage passes; the valve tube is perpendicular to the main valve body; a longitudinal spindle extends from a front end of the main valve body; a top end of the spindle is extended with a water control knob, which is in turn provided with annularly arranged teeth for the engagement with a foreign control device;

the first decorative cap is a hollow cylinder, an inner wall of which is provided with three stepped walls; a middle one of the three stepped walls is provided with an inner screw thread for engagement with an outer screw thread on an outer wall of the main valve body, as the first decorative cap is being mounted onto the main valve body; an upper one of the walls has a smallest inner diameter designed for being attached on a corresponding part of the main valve body;

a conversion mechanism includes a conversion sleeve and a conversion rod; the conversion sleeve is a hollow ring body capable of being engaged with the main valve body in the longitudinal direction; an inner wall of the conversion sleeve forms a gradually expended stepwise block surface for connecting an indication ring; a central part of the top end of the conversion sleeve is extended, both inwardly and outwardly, with a connection section, the connection portion further comprises an inwardly extended section and an outwardly extended section; there is a passage going through an axes of the outwardly extended section and the inwardly extended section; the axial passage is further provided with a connecting section with parallel teeth to the water control knob, whereby the conversion sleeve and the main valve body are mutually connected; an inner wall of the outwardly extended section is proved with an inner screw thread, whereas an outer wall of the inwardly extended section is provided with an outer screw thread, respectively for engaging the conversion rod and the first decorative cap;

the indication ring is a hollow ring body with a stepwise inner wall has a first annular surface on a top thereof for a connection between the indication ring and the conversion sleeve, whereby the conversion sleeve and the indication ring will rotate synchronically; a top surface of a next section of the indication ring around the first annular surface forms a second annular surface;

the conversion rod is a cylindrical rod and has an outer screw thread at a bottom end thereof for connecting the conversion sleeve; a top end of the conversion rod is provided with a connection knob which is a section of parallel teeth;

the second decorative cap is a cap body with a tapered outer shape and a stepwise inner wall; an inner wall of the second decorative cap is provided with an inner screw thread for engagement with the outwardly extended section from the conversion sleeve; further, the conversion rod passes through the second decorative cap and is locked with the outwardly extended section, and the connection knob at the top end of the conversion rod is extended out of the second decorative cap, whereby the second decorative cap will cover most of the conversion rod; and the handle is used for driving the water control valve so as to adjust water flow rate; the handle comprises a connecting section having an inner wall provided with a section of parallel teeth for engaging a corresponding section of parallel teeth of the connection knob, whereby the handle and the conversion rod are rotationally connected and can move synchronically.

2. The faucet with temperature control function having a replaceable handle of claim 1 wherein the second annular surface is carved with temperature indicators.

* * * * *